(No Model.) 8 Sheets—Sheet 2.

J. HINSTIN.
FURNACE.

No. 468,875. Patented Feb. 16, 1892.

Fig. 2

Witnesses:
E. B. Bolton
H. Kusterer.

Inventor:
Joseph Hinstin
By Richards &
his Attorneys.

(No Model.) 8 Sheets—Sheet 5.

J. HINSTIN.
FURNACE.

No. 468,875. Patented Feb. 16, 1892.

Witnesses:
E. B. Bolton
H. Kusterer

Inventor:
Joseph Hinstin
By [signature]
his Attorneys.

(No Model.) 8 Sheets—Sheet 6.

J. HINSTIN
FURNACE.

No. 468,875. Patented Feb. 16, 1892.

Fig. 6.

Witnesses:
E. B. Bolton
H. Kusterer

Inventor:
Joseph Hinstin
By Richards & Co.
his Attorneys.

(No Model.) 8 Sheets—Sheet 7.
J. HINSTIN.
FURNACE.

No. 468,875. Patented Feb. 16, 1892.

Witnesses:
E. B. Bolton
H. Kusterer

Inventor:
Joseph Hinstin
By Richards &c
his Attorneys.

(No Model.)  8 Sheets—Sheet 8.

J. HINSTIN.
FURNACE.

No. 468,875.  Patented Feb. 16, 1892.

Witnesses.
E. B. Bolton
H. Kusterer

Inventor:
Joseph Hinstin
By
his Attorneys.

UNITED STATES PATENT OFFICE.

JOSEPH HINSTIN, OF PARIS, FRANCE.

FURNACE.

SPECIFICATION forming part of Letters Patent No. 468,875, dated February 16, 1892.

Application filed July 23, 1891. Serial No. 400,460. (No model.) Patented in France December 29, 1890, No. 210,497.

*To all whom it may concern:*

Be it known that I, JOSEPH HINSTIN, a citizen of the French Republic, residing at Paris, in said Republic, have invented certain new and useful Improvements in Furnaces, (patented in France December 29, 1890, No. 210,497,) of which the following is a full, clear, and exact description.

The object of this invention is to provide a new arrangement of furnace in which a complete combustion takes place and which is characterized by the combination of the three following elements: first, a front furnace; second, a "furnace," properly so called, and, third, a back furnace, the shape and dimensions of which latter may vary according to the kind of fuel to be used in the furnace, and which back furnace may be formed of chambers into which the air necessary for combustion is caused to penetrate by means of nozzles, gratings, or air-passages, which are of such sizes and dimensions as are best suited for the fuel employed, this latter being itself held up or supported, according as the case may require, by means of bars of variable shapes, according to the state of the fuel employed.

First. The front furnace is the part in this new arrangement of furnace in which the distillation of the gases from the fuel is effected, and the mixture of the former with air takes place in proportion as the fuel becomes more and more heated. Such mixture of gases and air is carried off from this front chamber and thrown down into the draft-chamber, which ends in a combustion-nozzle over incandescent coke. It is this part of the new arrangement where what is usually termed "smoke-consuming" is performed. It is formed of a chamber inclosed on the one hand by grate-bars of variable shape and position, according to the state of the fuel, arranged vertically or horizontally and fitted or not with air and gas conductors, regulated, if need be, by registers intended to cause the air to penetrate the mass of fuel, the whole serving to hold up the latter, if requisite, and to facilitate the admixture and exit of the air and gas, and on the other hand by a counter-grate, also variable in shape, and which serves to bring the mixture of air and gas to the "furnace," properly so called. This front grate may be specially fitted with bars having the shape of gutters, so as to allow of liquid fuels being burned by mixing them with the solid fuel placed in the front furnace.

Second. The furnace proper is that part of this new arrangement of furnace in which the distillation of the gas is continued and completed, where the combustion of the mixture of gas and air coming from the back grate is performed, and where the transformation of the combustible gases and carbonic acid commences. It is formed of a chamber bordered on the one hand by the front furnace and on the other hand in front by a fire-grate intended simply for lighting and cleaning purposes and by fixed or movable grate-bars more or less inclined or arranged horizontally and provided or not with air-passages, which may have applied to them suitable registers for allowing the air to penetrate into the body of the fuel, which the bars may hold up, if required, and, finally, on the other hand, by the back furnace. The furnace has, further, an ash-pan and the door of the ash-pan, in which a register is fixed which regulates the admission of air under the furnace-grate.

Third. The back furnace is the part of this new arrangement of furnace in which the combustion is terminated and completed by the transformation of the combustible gases into carbonic acid. It is formed of a chamber inclosed on the one hand by the "furnace," properly so called, and on the other hand by the fire-bridge and the arch for throwing down the flames which covers or surrounds it, and has in its lower part bars serving to hold up the ignited fuel and which necessarily present to the layer or fuel a triangular section, the base of which is connected with the actual furnace and the summit with the opposite end of the bars on the side of the bridge. These bars form a grate, which may have an up-and-down motion for shaking up the fuel and for increasing the passage of the air supplied by a register, oscillating or otherwise, and which distributes the air, as desired, under the grate of the furnace or under that of the back furnace. This back furnace is further made complete by three air-inlets placed at the angles of the triangle—that is, one at the entrance of the back furnace above where the fuel is thickest, a second at the lower extremity of the movable grate below where the fuel is thickest, and the third at the upper end of the movable grate at the summit of the triangle at a point where there is no thickness of fuel, these two last air-inlets being regulated by means of a lever which allows of the movable grate being more or less inclined.

In order to facilitate the comprehension of the description, reference is made to the annexed drawings, which represent, by way of example, various applications of this new arrangement of furnace.

In the drawings.

In the various figures the same reference-letters represent the same parts.

The various arrangements all have, first, a front furnace $a$, acting in the same way as the front part of the grate of an ordinary furnace erected vertically and overhanging the lower part which supports the incandescent coke; second, the furnace proper $b$; third, a back furnace $c$.

Figure 1:
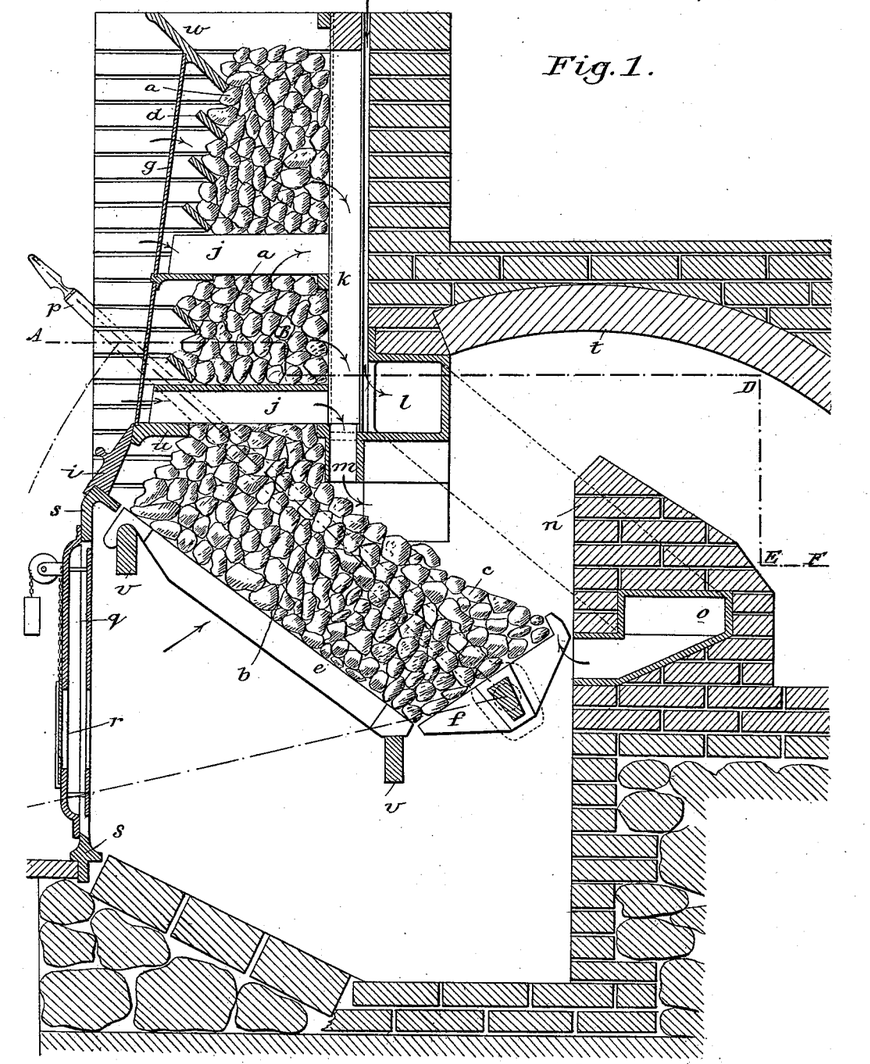
Figure 1 represents an elevation in section on line G H I K of Fig. 2 of an industrial furnace arranged according to this invention.
Figure 2:
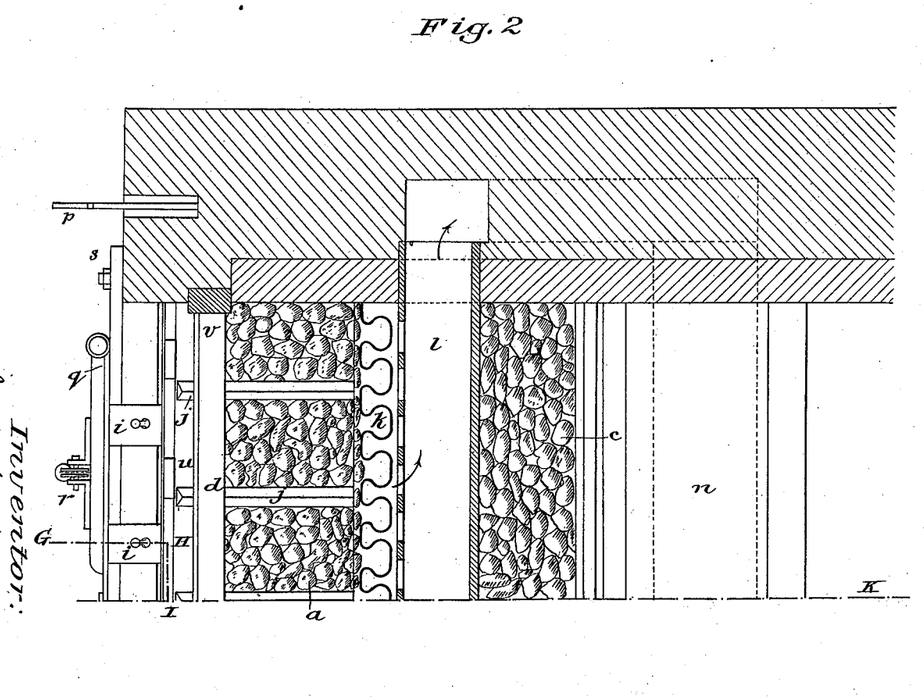
Fig. 2 represents a half-plan view in section of the same furnace, taken on the line A B C D E F of Fig. 1.
Figure 3:
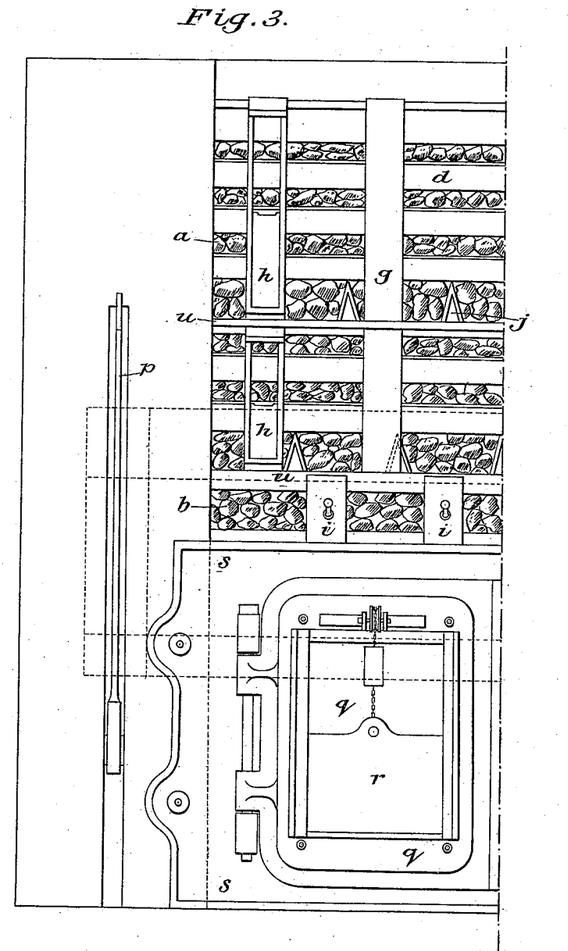
Fig. 3 a half-front elevation of the same furnace, the shutters forming the register for the admission of air being removed at certain points.
Figure 4:
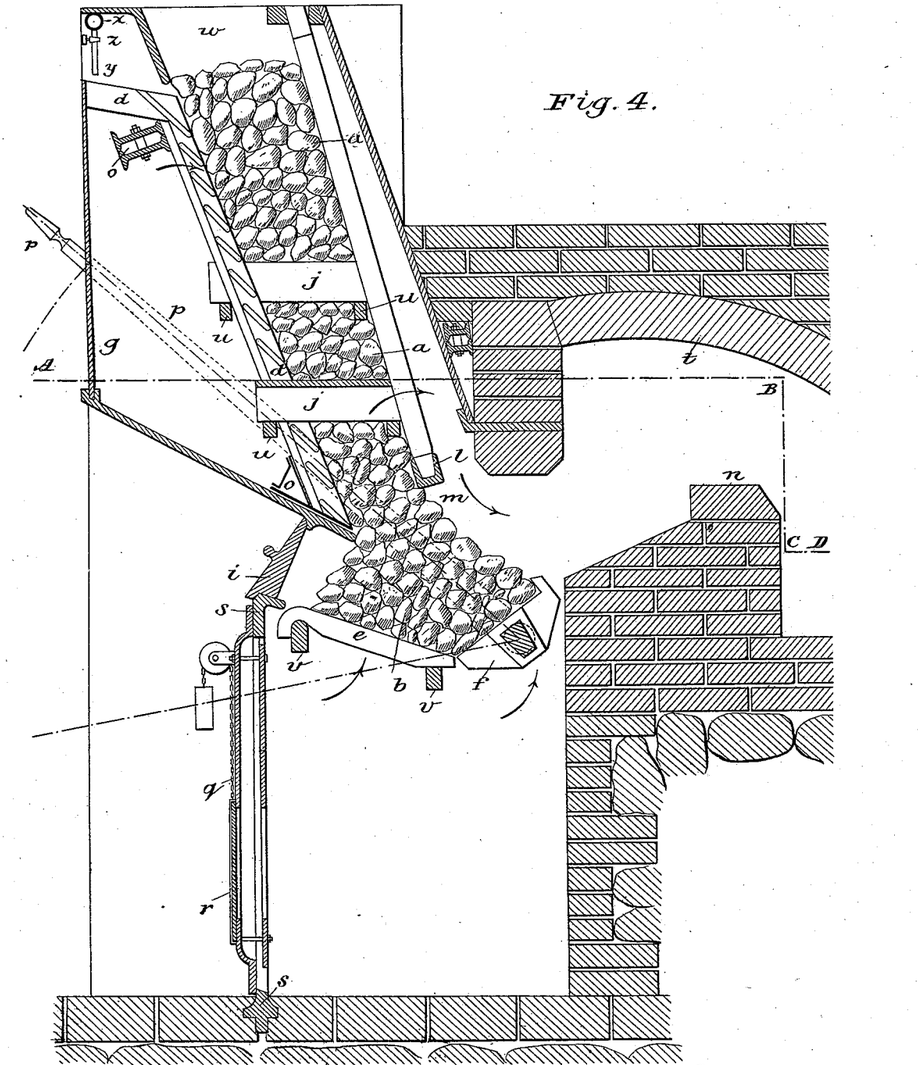
Fig. 4 represents an elevation in section on the line E F of Fig. 5 of an industrial furnace for liquid fuel arranged according to this invention.
Figure 5:
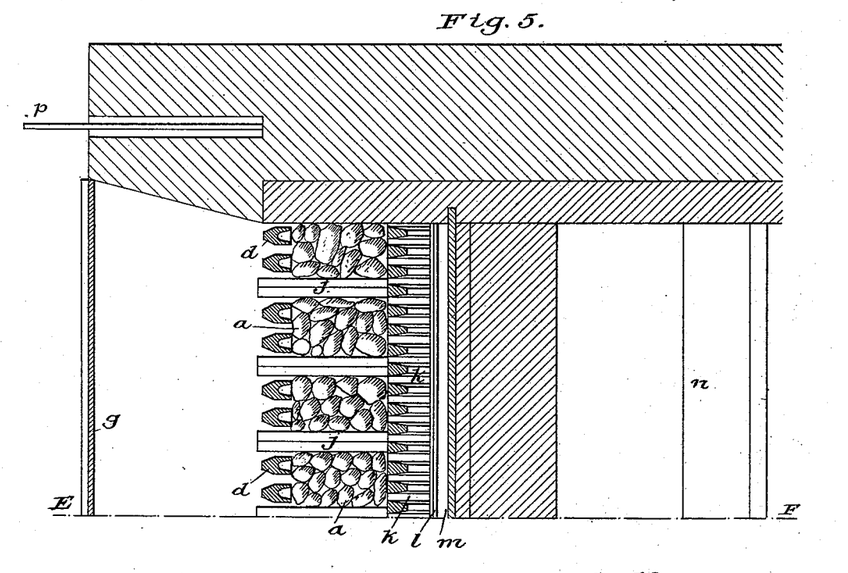
Fig. 5 represents a half-plan view in section of the same furnace on the line A B C D of Fig. 4, and Fig. 6 a half-front elevation of the same grate.
Figure 6:
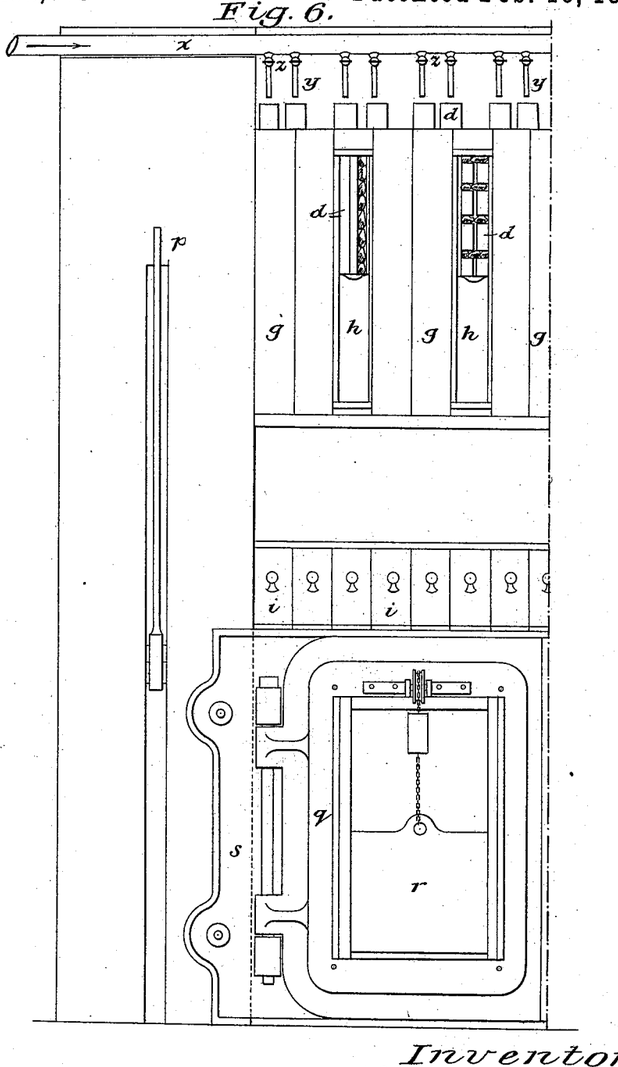
Figure 7:
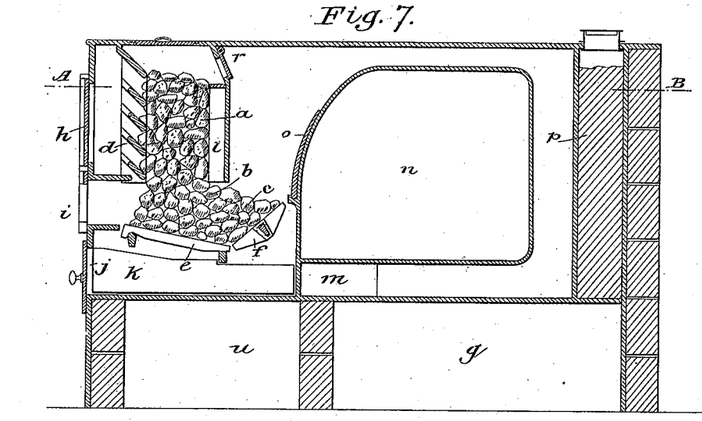
Fig. 7 is a sectional elevation of the same furnace on the line C D of Fig. 8.
Figure 8:
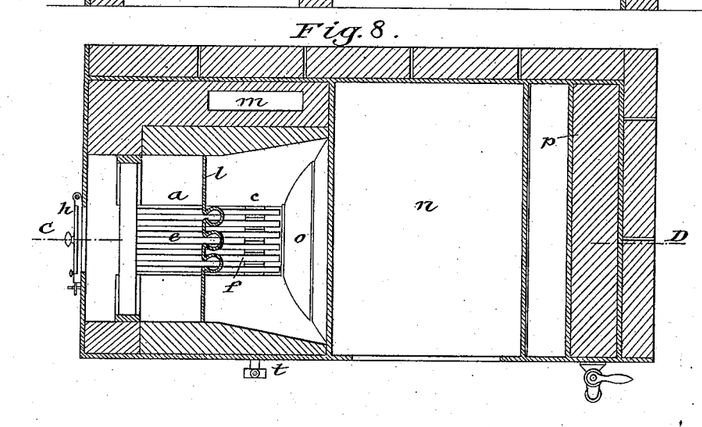
Fig. 8 shows the sectional plan view of the same on the line A B of Fig. 7.
Figures 9, 10:
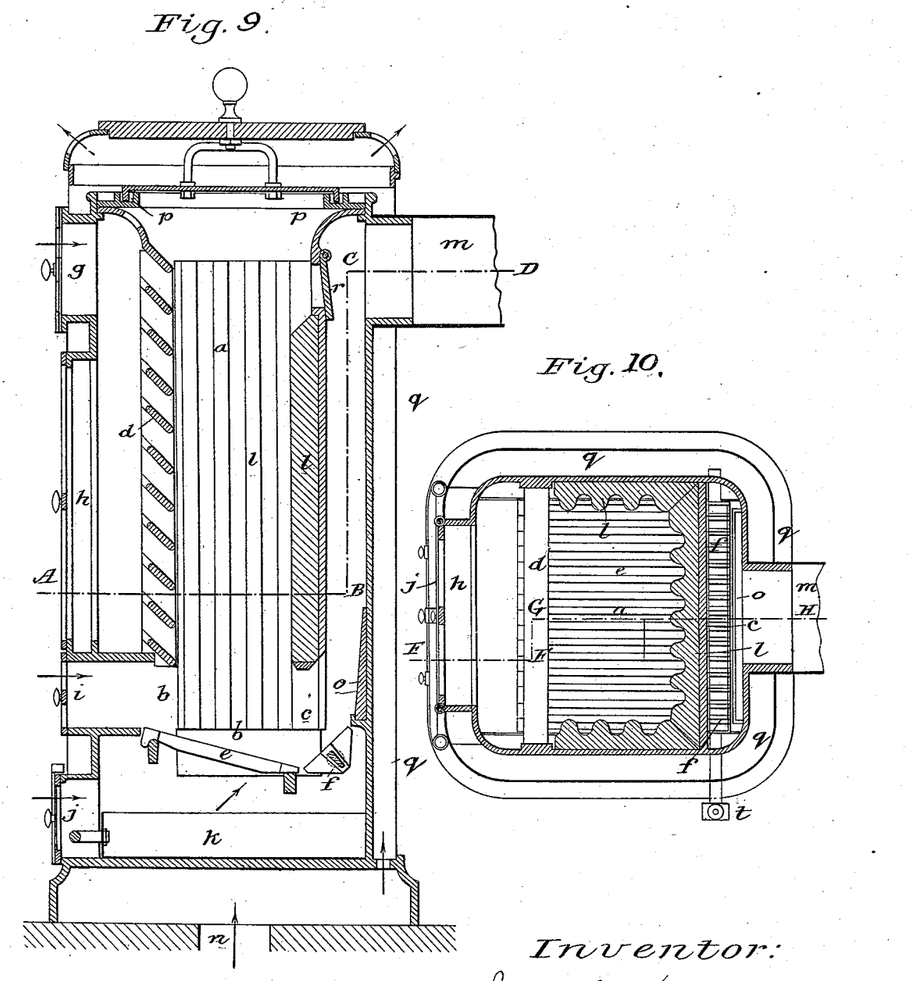
Fig. 9, an elevation of the same in section on the line E F G H of Fig. 10.
Fig. 10 shows a sectional plan view of the same on the line A B C D of Fig. 9.
Figure 11:
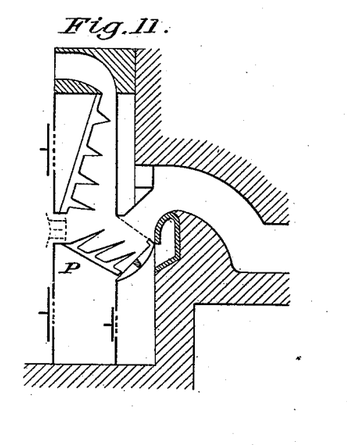
Figs. 11 and 12 show arrangements of combined furnaces for burning coke-dust, and characterized by a special combination of the grates of the furnace and of the back furnace.
Figure 12:
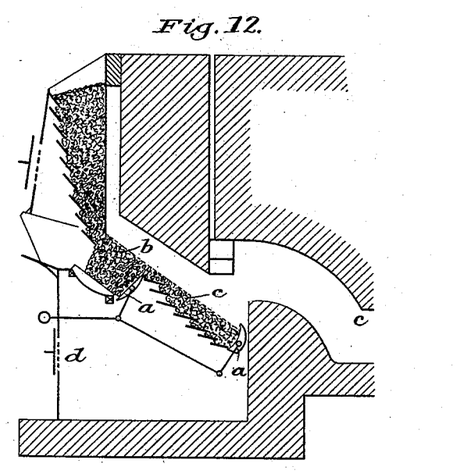

The front furnace $a$, which is surmounted where necessary by a charging-hopper $w$ for the fuel, is of dimensions suitable to the consumption of fuel and the time of distillation, with as large a capacity as possible, for a part of the carbonic oxide formed in the furnace rises somewhat into the front furnace and may be advantageously treated like the gases from a point of view of combustion. The form to be given to this front grate will depend essentially on the nature of the fuel to be consumed therein. If the fuel is adhesive, a form of front furnace may be preferably employed, such as is shown in Fig. 1—that is to say, the descent of the fuel may be facilitated by widening out the front furnace at the bottom. If, on the other hand, the fuel be slippery, fine, and dry, it would be preferable to sustain it by having the narrower section below and by using flat grates. The air necessary for producing the mixture with the gases of the fuel is introduced into this front furnace by a grate $d$, which may also be of various forms and sections, according to circumstances and requirements. These grate-bars may be arranged vertically or horizontally, as required, and may be of different useful forms. In the arrangement especially of a grate held up by supports $o'$ $o'$ (shown in Figs. 4 and 5) heavy oils may be caused to run into the hollow parts of this latter, which oils could be fed by the pipe $x$ and distributed by the tubes $y$, having taps $z$, these oils burning simultaneously with the solid combustible placed in the chamber of the front furnace. The admission of air into the front chamber is regulated by means of a regulating-register situated in the inspection-door $h$. For this purpose any combination of known devices may be employed. Opposite to the grate, for the admission of air into the front furnace, is the counter-grate $k$, sustained by means of supports $l'$ $l'$, Fig. 4, and serving to keep the fuel in the front furnace at a suitable thickness, while allowing the air and gas after having passed through the layer of fuel to reunite and become finally mixed behind this counter-grate in a chamber where the draft acts and brings the mixture over the incandescent coke. This counter-grate is made like an ordinary grate with an arrangement for cooling the bars which are nearest to the heat of the fire by means of a circulation of water or air. In certain cases this counter-grate may be advantageously replaced by a similar arrangement in brick or fire-clay, or simply, as shown in Fig. 9, by fire-clay walls, which are more or less undulated, thereby increasing the surfaces of small resistance, if not to form actual chambers. Between the grate and the counter-grate, if it be necessary, air or gas conductors $j$ are placed, Figs. 1 to 6, held up by supports $u$, intended to allow a sufficient quantity of air, which is indispensable for mixing with the gases and for their total combustion to penetrate the mass of fuel, and which also serve to facilitate the passing away of the mixture. The aeration of the fuel may in many cases, as in Figs. 7 to 9, take place of itself between the two grates, the latter being given a suitable form and the layer of fuel being of such a thickness as to allow the air to easily penetrate it; but if for any reason—such, for instance, as for facilitating the descent of the fuel, it is necessary to increase the width of the layer of fuel at the bottom of the front furnace to such a point that a larger quantity of air is necessary recourse may be had to this method of aeration. This air-conductor may be made either in the form of a flat bar or in that of two bars simply, placed side by side or arranged in a triangular form, or even may be made of partitions in the form of grates, allowing of such quantities of air as may be necessary being brought in every direction into the mass, and at the same time of the gas produced being carried off. The number and nature of the bars forming these gas-conductors may naturally be varied according to circumstances, and the admission of air into these conductors may be regulated, as desired, by means of plugs forming registers or by any other suitable means. According to the fuel which is to be consumed, these air-conductors must have different shapes. If, for instance, the combustible is to descend easily, they must have very acute angles; but if, on the contrary, their object is to bring air into a very compact but sliding mass—such, for instance, as coke-dust—they must assume the form of obtuse bars, thus supporting the fuel. In this particular case grate-bars might even be preferably employed having projections cast in one piece with the bars.

The "furnace" $b$, properly so called, is like all furnaces formed of the following parts: First, the door $i$, which may be of a shape resembling movable plugs and be perforated, and have a register allowing air to be admitted in greater or less quantity. This door, which is placed in the front $s$ of the furnace, Figs. 1 to 6, is variously arranged. It may be usually smaller than the doors of ordinary furnaces because it is not generally used for charging. It is used for lighting the fire and for assisting the cleaning. The door of the furnace may have retaining-hooks for placing paddles or pokers on under the front furnace and for holding up the fuel in case it is desired to empty the furnace alone. Second, the grate, which is formed by the bars $e$, as usually employed of various more or less inclined shapes, placed according to requirements and the nature of the fuel and held up by supports $v$. The part called the "air and gas conductor" in the front furnace may also be made to serve for this grate, or there may be employed bars having additions of points or projections capable of supporting the fuel while introducing into the mass the air which is necessary for the mixture with the gas in proportion as it is produced. If a fine but not adhesive fuel is to be dealt with—such, for instance, as coke-dust—the bars may be arranged in such a way that the layer of coke is as thin as possible to allow of the passage of the air. In order, however, to have at a given point a sufficient quantity to produce and maintain the incandescence, the grate may be divided into one or more parts by means of movable grates, the effect of which is not only to multiply the incandescent masses, but also to cause currents of air to pass from place to place behind the movable grates. Third, the regulating-register $r$ for the admission of air under the "furnace," properly so called, is fixed in the door itself of the ash-pan $q$ and it is made in any suitable known manner.

The back furnace, which adjoins the actual furnace, is essentially composed of a combustion inlet or nozzle $m$ for the gases of the front furnace, of a movable grate $f$, of a bridge $n$, of a part for throwing down the flame with an arch $t$ for radiating the heat, and of a regulating-register for the admission of air. The combustion-nozzle $m$ for the gases of the front furnace is placed at such a point that the gases shall be able to pass exactly between this point and the bridge on the one hand and the surface of the incandescent fuel on the other without spoiling the draft. This point forms the entrance of the back furnace. This entrance is generally formed like a bridge with an air-collector to preserve it from too rapid a deterioration. The entrance of the back furnace has the essential effect, first, of forcing the mixture of air and gas coming from the front furnace to pass down as close as possible to the incandescent fuel on the grate of the furnace proper; second, of introducing air in excess onto the incandescent fuel at the point where it is the thickest and highest, at the entrance of the back furnace and consequently at the point where the most carbonic oxide is produced, and, third, of producing the intimate mixture of the same by throwing them down, and then produce the combustion of the mixture by forcing it to pass in proximity to the incandescent coke.

According as to whether the bridge $n$ of the back furnace is more or less elevated, with the entrance-inlet always lowered to the maximum extent, the flame may be more or less deflected, which may, however, always be limited by the construction of the arch $t$ for throwing down the flame and by the necessities of the installations.

The movable grate $f$ of the back furnace is composed of bars, the forms and sections of which are suited to the nature of the fuel, but connected among themselves in such a way that all the grate, as a whole or part thereof, may turn on an axis, being caused to move by means of levers $p\ p$. The grate is arranged in such a way that one of its extremities ends at the natural line of slope of the incandescent fuel at its exit from the front furnace. This grate $f$ may terminate at its upper end in a hook or catch, which will retain the combustibles and will render the working of the movable grate more exact as regards the introduction of air into the back of the furnace for the purpose of effecting the total combustion of the carbonic oxide; but the movable grate of the back furnace may at the same time serve to cause the cinders contained in the incandescent fuel to fall out. For that purpose it is sufficient to give a back and forward motion to the grate by means of levers, which act directly on the axis of the grate or otherwise. In this way either the whole or a part of the grate of the furnace proper $e$ may be made to move at the same time by causing it to come in contact with the extremity of the movable grate. The bridge $n$ does not exhibit anything particular, unless in this arrangement of back furnace it becomes the auxiliary of the movable grate, in order to allow a greater or smaller current of air to penetrate perpendicularly to the direction of the combustible gases by means of a channel or passage o, Fig. 1, which distributes the air under the grate of the back furnace. It may be constructed in any known way and with or without air circulation, as may be required and to aid in the deflection of the flame.

The dome of the back furnace for deflecting the gases and for effecting the radiation of the heat is arranged so as best to fulfill these two purposes in view of its application and needs, and as far as possible in such a way as to cause the heat to radiate at the point where the mixture of air and gas is the greatest. The object of the deflection of the flame is to complete the mixture of the air and the combustible gases, and that of the vault to complete the combustion of the mixture.

The admission of air into the back furnace is simultaneously regulated with the admission of air under the grate of the furnace proper by means of a register r, placed in the door of the ash-box. The air, if desired, may be divided between the grates of the two furnaces by means of the movable partition placed between the ash-box of the furnace proper and that of the back furnace. The air-collector l, Figs. 1 and 2, placed at the entrance of the back furnace, also sends warm air by a pipe placed in the bridge under the grate of the back furnace. A portion of the air of this collector may be sent to the gas-combustion nozzle of the front furnace or to any other suitable place in pottery-furnaces. Especially such inlets of air may be also regulated by suitably-placed registers.

The different industrial furnaces, as above, have been so described under the supposition that they worked always with an oxidizing flame producing carbonic acid in order to yield the most complete combustion; but in certain cases it may be necessary to cause the furnace to work otherwise—for instance, in the case of a steam-boiler, if the temperature is too high at the point of contact with the fire, or in the case of pottery-furnaces. For this purpose a portion of the warm air, which is usually caused to come to the back furnace, is diverted and is directed by means of a pipe and a valve suitably placed at the extremity of the first contact-point of the fire to a point capable of still heating a brick to redness, and at this point a fire-brick arch is formed, which forces the current of the products of combustion to pass downward. A groove may be made at this point, if necessary, in the bottom of the flue, in order to leave a sufficient width for the passage of the products of combustion.

In pottery-furnaces when the first half of the furnace is acid and brought to an incandescent redness, this first part may act in a similar manner to what the arch above mentioned would do, and by bringing the necessary air to this point, while the furnace is being worked with carbonic oxide, a second center of combustion is obtained, which serves to facilitate the second part of a baking in the furnace.

Among the different parts which have been just described some which exist and are shown in Figs. 1 to 6 are not found in the other figures, where they would be useless or superfluous. In exchange for that there are found there some details, such as a regulating-valve j, fixed on the door of the ash-pan k or otherwise and intended to allow the air to penetrate under the furnace proper, an opening m for the escape of the smoke, a fire-clay fire-plate o, a damper r, fitted with a handle s, a pastry-oven m', a boiler p, a stove q, a coal-box u, and rods v for regulating the valve, Figs. 7 and 8, an inlet for the admission of fresh external air n, a casing q'', forming an air-chamber, and a closing device of the charging-hopper.

Having now particularly described and ascertained the nature of the said invention and in what manner the same is to be performed, I declare that I wish it to be understood that the shapes, dimensions, proportions, and accessory parts of the various constituent parts of this new arrangement of furnace and the materials to be used in its construction or erection may be varied as may be considered suitable without departing from the principle of my invention; but that

What I claim is—

1. The combination, with the furnace proper and the back furnace, of the back furnace composed of a chamber inclosed on the one hand by the furnace proper, on the other by the bridge and dome, the said back furnace being further completed by an air-inlet placed at each of the three angles of the triangle— namely, one at the entrance of the back furnace above the point where there is the maximum thickness of fuel, a second at the end of the lower extremity of the movable grate below where the fuel is thickest, and a third at the upper end of the movable grate at the top of the triangle at the points where there is no depth of fuel, these two latter air-inlets being regulated by means of a lever, which allows of the movable grate being more or less inclined, and further by means of registers for admitting and dividing the air, substantially as described.

2. The combination, with the air and gas conductor, of the counter-grate in the form of an undulated partition and doors allowing for inspection, repairs, or replacement of parts, substantially as described.

3. The combination, with the grate, of air and gas conductors in the bars of the furnace-grate in the form of partitions in order to introduce air into the same while holding up the fuel, substantially as described.

4. The combination, with the back furnace, front furnace, and movable grate provided with hot-air passages, of a bridge and hot-air pipes leading thereto from the counter-grate, substantially as set forth.

In witness whereof I have hereunto set my hand in presence of two witnesses.

JOSEPH HINSTIN.

Witnesses:
ROBT. M. HOOPER,
JULES FAYOLLETZ.